United States Patent Office 2,817,114
Patented Dec. 24, 1957

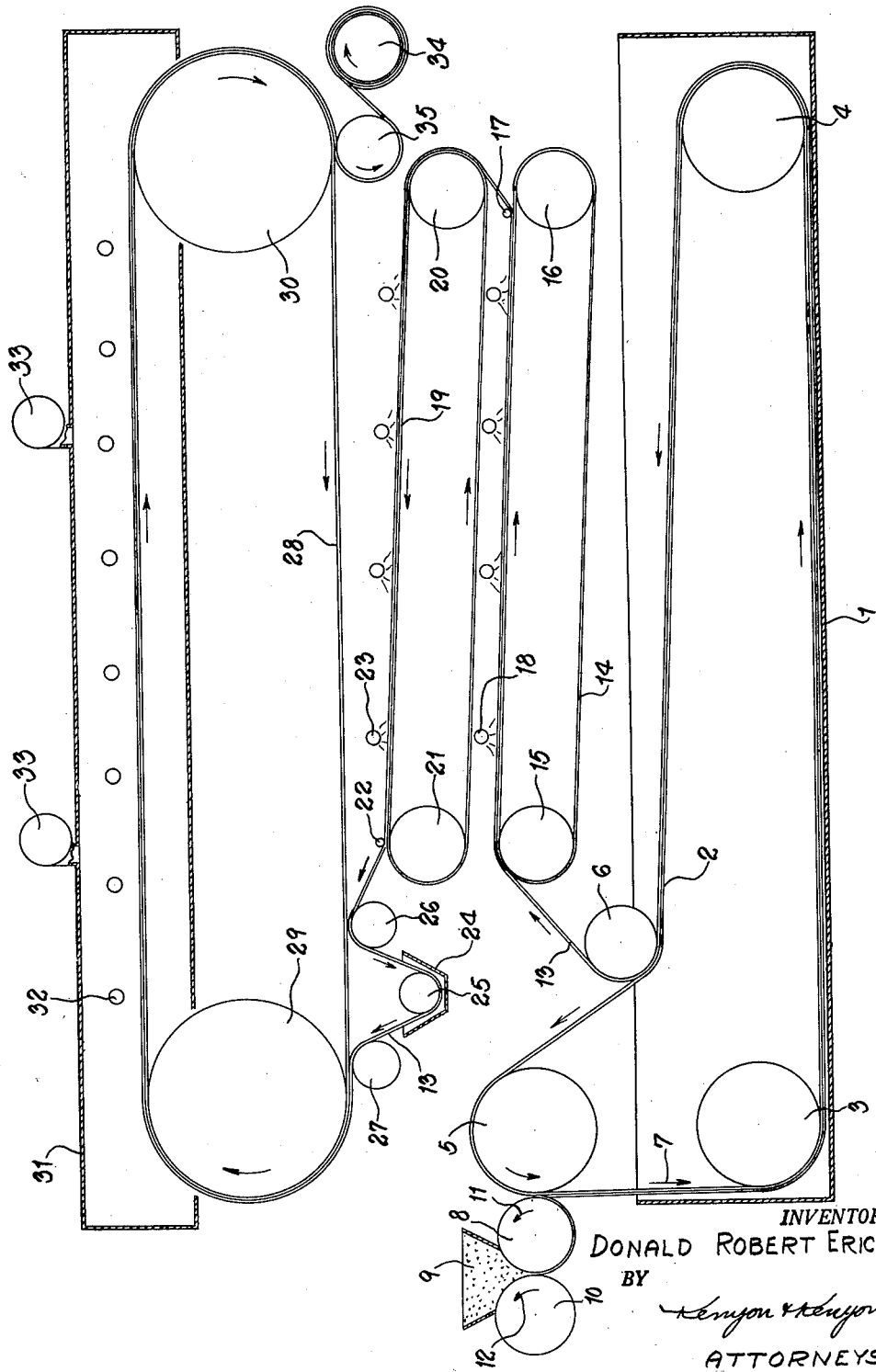

2,817,114
APPARATUS FOR PRODUCING HYDROXY ALKYL CELLULOSE FILM

Donald Robert Erickson, Kalamazoo, Mich.

Application January 4, 1954, Serial No. 401,831

3 Claims. (Cl. 18—15)

This invention relates to apparatus for the production of hydroxy alkyl cellulose films which are substantially nonoriented.

When a solution of hydroxy alkyl cellulose or other cellulose derivatives are extruded thru an aperture into a precipitating solution, a thin skin of precipitated cellulose derivative is immediately formed on both sides of the viscous extruded film forming a sandwich of unprecipitated material held between two thin layers of precipitated material. This sandwiched film is then pulled under tension thru more of the precipitating soltuion so that further precipitation is taking place while the film is under tension.

This action induces internal stresses in the film and as a result the film becomes oriented and shows large inequalities between longitudinal and tranverse stretch.

A substantial amount of orientation takes place in forming a film while precipitating under tension and another substantial amount of orientation takes place when such a film is dried under tension and not in continuous contact with a supporting belt.

It has been found that by means of casting onto an endless belt and fully precipitating the cellulose derivative before it is removed from the belt, the stresses caused by precipitation while under tension are eliminated and a substantially non-oriented film results.

A film cast onto a supporting belt, fully precipitated while in contact with said belt and then fully dried while in intimate contact with another endless belt shows very great advantages in dimensional stability.

Another object is to provide a machine for producing substantially nonoriented hydroxy alkyl cellulose film.

Another object is to provide a continuous machine in which the film is maintained at a constant width throughout the operation.

Another object is to provide such a machine in which the film is formed and dried against continuously moving, smooth surfaces and in which the operation of the various parts of the machine is such that they are coordinated to maintain the material in close face-to-face contact with the flat surfaces during the formation and drying of the material.

Other objects of the invention will be apparent from the description of the invention in the following specification.

For the purpose of illustrating the invention there is shown in the accompanying drawing a form of the invention which is at present preferred since it gives desirable and satisfactory results. It will be understood, however, that the instrumentalities of which the invention consists may be differently arranged and organized and that the invention is not limited to the specific arrangement and organization of the instrumentalities herein shown and described.

The invention consists generally in forming a thin coating or film of a solution of hydroxy alkyl cellulose and specifically hydroxyethyl cellulose in dilute aqueous sodium hydroxide solution on a continuously moving, smooth belt. The hydroxy alkyl cellulose is completely precipitated from solution while the solution is in contact with the belt and while the belt is moving. This forms a continuous strip of the hydroxy alkyl cellulose which is then stripped from the moving belt and carried through a washing section of the machine where the film of hydroxy alkyl cellulose is washed while supported on wire mesh belts which exposes both sides of the film to sprays. Thereafter the film is plasticized and is then, while still moist and while containing large quantities of water, pressed firmly and in face-to-face contact with a second smooth, flat continuously moving belt. It is dried while it is in contact with this belt, which is driven at a speed very slightly greater than the speed of the movement of the hydroxy alkyl cellulose film through the preceding portion of the machine so that a very slight tensioning pull is exerted. This holds the moist film firmly in contact with the moving belt on which it is dried to eliminate shrinkage of the material during drying.

When this method and machine are employed, the product is substantially nonoriented film. It differs from film made by extrusion processes and likewise maintains a smooth, even finish and a constant width throughout since it is formed and dried in contact with smooth, flat surfaces.

The machine consists of a precipitating section comprising a tank 1 and a smooth, continuous flat belt 2, which may be of stainless steel or plastic material which is not adversely affected by the solution of hydroxy alkyl cellulose in sodium hydroxide or by the precipitating medium. This belt is trained over rollers 3 and 4 which carry it through the precipitating tank 1. It is also trained over the roller 5 and the roller 6. The belt moves in the direction of the arrows 7. Adjacent the precipitating tank is a transfer roller 8 which has means for driving at a peripheral speed of about one and one half times that of the belt 2. Adjacent thereto is a fountain 9 for holding the solution of hydroxy alkyl cellulose. Directly adjacent the transfer roller 8 is a doctor roller 10 which is in face-to-face relationship thereto but slightly spaced therefrom. The means for driving the roller 8 drive it in a direction indicated by the arrow 11 and means are provided for driving the roller 10 in the direction of the arrow 12 and at a speed about one-twelfth that of the speed of the roller 8.

This roller serves as a doctor for smoothing out the hydroxy alkyl cellulose solution as it is fed from the fountain.

The fountain is filled with a solution in aqueous sodium hydroxide of hydroxy alkyl cellulose. For instance, when hydroxyethyl cellulose is used an 8% solution in 7% aqueous sodium hydroxide may be employed. This is a solution having a viscosity ranging from 2,000 to 20,000 centipoises depending on conditions of manufacture of the hydroxyethyl cellulose. The solution feeds from the fountain to the roller 8. The roller 10 serves as a doctor or smoothing roller and assists in the distribution of a uniform film of the hydroxy alkyl cellulose on the surface of the roller 8. As an example a film of about 0.010 inch is formed on the surface of the roller 8. This deposits a film of about 0.015 inch on the surface of the belt 2.

The film of solution thus formed is carried along on the belt to the precipitating section. It passes through the tank 1 where the hydroxy alkyl cellulose is completely precipitated by any suitable medium, thus forming a film of hydroxy alkyl cellulose directly on the face of and in contact with the belt 2.

It will be appreciated that the precipitation of the hydroxy alkyl cellulose can be carried out by means of the application of carbon dioxide and heat.

When the film 13 of hydroxy alkyl cellulose has been precipitated on the belt 2, it is transferred to the washing section. This is accomplished by carrying it around the roller 6 and up to the wire mesh belt 14, which is carried on rollers 15 and 16 in the washer section. The film 13 passes along the top of the wire, as shown in the drawing, to a rod 17. Water is applied thereto by spray heads 18. The film is then transferred to a second wire mesh belt 19, which is mounted on rollers 20 and 21. It is carried to a rod 22. Water is applied through the sprinkler heads 23. The film, which at this point may contain as much as 12 parts of water to one part of hydroxy alkyl cellulose, is pressed by roll 26 and passes to a plasticizing unit, which consists of a tank 24 which contains the plasticizing solution, which may be water and glycerine. The roller 25 in the tank takes the film 13 down into the tank and rollers 26 and 27 guide it in its passage. Roll 27 also squeezes off excess or plasticizing solution and applies the film to the drying belt.

The film then passes thru the drying section, which comprises a belt 28 which is a smooth, continuous, flat belt. The belt may be of stainless steel or plastic material. It is carried on rollers 29 and 30 which are driven to carry it in the direction indicated.

When the hydroxy alkyl cellulose reaches the drying section, it contains water equal to several times its own weight so that the film is still damp and swollen. It is pressed flat against the face of the belt 28 in face-to-face relationship and is carried through a drying hood 31, which has heating means 32 and which may be supplied with fans 33.

The film is then dried in the hood 31 while it is maintained tightly against the belt. It is thus maintained at substantially the same width as when it entered the drying unit.

In the drying unit the water is substantially all removed and in the final film the water content is from 10 to 12% that of the hydroxy alkyl cellulose.

The film is wound up on a roll 34 after passing over a roll 35 to remove it from the belt 28.

In carrying out this method and in using this machine, it is possible to produce substantially non-oriented film which is flat and smooth and of uniform width and thickness. The film is produced continuously and economically.

It will be understood that the present invention may be embodied in other specific forms without departing from the spirit or essential attributes thereof. It is therefore desired that the present embodiment of both the method and apparatus and the product be considered in all respects as illustrative and not restrictive, reference being had to the appended claims rather than to the foregoing description to indicate the scope of the invention.

I claim:

1. Apparatus for forming hydroxy alkyl cellulose films comprising a precipitating section comprising a tank; a continuous, smooth forming belt mounted for continuous movement and extending in part through said precipitating section; means for driving said belt; means adjacent said precipitating section for forming a viscous film of hydroxy alkyl cellulose solution on said forming belt comprising an applicator roll mounted for rotation in contact with the face of said belt; means for driving said applicator roll in a direction counter to the movement of said forming belt and at a peripheral speed greater than the speed of said belt; a fountain for applying hydroxy alkyl cellulose to said applicator roll; a doctor roll mounted for rotation in face-to-face relationship to said applicator roll; means for driving said doctor roll at a peripheral speed less than the peripheral speed of said applicator roll; a washer section comprising a pair of endless screen belts mounted adjacent said precipitating section to receive film from said forming belt and mounted for continuous movement one above the other, whereby film may be carried on one wire screen belt with one face exposed for washing and to be transferred to the other belt with the other face exposed for washing; spray means adjacent said wire screen belts; a dryer section comprising a smooth, continuous dryer belt mounted for continuous movement adjacent said washer section to receive film therefrom; heating means for said dryer section and means for driving said dryer belt at a speed slightly in excess of the speed at which the film passes from said washer section, whereby a slight pull is applied to the film coming from said washer section, whereby said film is pulled into close face-to-face contact with said dryer belt in dampened condition for drying, whereby transverse shrinkage during drying is eliminated.

2. Apparatus for forming hydroxy alkyl cellulose films comprising a precipitating section; a continuous, smooth forming belt mounted for continuous movement and extending in part through said precipitating section; means for driving said belt; means adjacent said precipitating section for forming a viscous film of hydroxy alkyl cellulose solution on said forming belt comprising an applicator roll mounted for rotation in contact with the face of said belt; means for driving said applicator roll in a direction counter to the movement of said forming belt and at a peripheral speed greater than the speed of said belt; a fountain for applying hydroxy alkyl cellulose to said applicator roll; a washer section comprising a pair of endless screen belts mounted adjacent said precipitating section to receive film from said forming belt and mounted for continuous movement one above the other, whereby film may be carried on one wire screen belt with one face exposed for washing and to be transferred to the other belt with the other face exposed for washing; spray means adjacent said wire screen belts; a dryer section comprising a smooth, continuous dryer belt mounted for continuous movement adjacent said washer section to receive film therefrom; heating means for said dryer section and means for driving said dryer belt at a speed slightly in excess of the speed at which the film passes from said washer section, whereby a slight pull is applied to the film coming from said washer section, whereby said film is pulled into close face-to-face contact with said dryer belt in dampened condition for drying, whereby transverse shrinkage during drying is eliminated.

3. Apparatus for forming hydroxy alkyl cellulose films comprising a precipitating section; a continuous, smooth forming belt mounted for continuous movement and extending in part through said precipitating section; means for driving said belt; means adjacent said precipitating section for forming a viscous film of hydroxy alkyl cellulose solution on said forming belt; a washer section comprising a pair of endless screen belts mounted adjacent said precipitating section to receive film from said forming belt and mounted for continuous movement one above the other, whereby film may be carried on one wire screen belt with one face exposed for washing and to be transferred to the other belt with the other face exposed for washing; spray means adjacent said wire screen belts; a dryer section comprising a smooth, continuous dryer belt mounted for continuous movement adjacent said washer section to receive film therefrom; heating means for said dryer section and means for driving said dryer belt at a speed slightly in excess of the speed at which the film passes from said washer section, whereby a slight pull is applied to the film coming from said washer section, whereby said film is pulled into close face-to-face contact with said dryer belt in dampened condition for drying, whereby transverse shrinkage during drying is eliminated.

References Cited in the file of this patent

UNITED STATES PATENTS

| 947,457 | Ratignier et al. | Jan. 25, 1910 |
| 1,748,868 | Dethloff | Feb. 25, 1930 |
| 2,265,916 | Lilienfeld | Dec. 9, 1941 |
| 2,318,552 | Czapek | May 4, 1943 |
| 2,371,155 | Czapek | Mar. 13, 1945 |
| 2,444,626 | Bixby | July 6, 1948 |

FOREIGN PATENTS

| 552,498 | Great Britain | Apr. 12, 1943 |